US006931510B1

(12) United States Patent
Damron

(10) Patent No.: US 6,931,510 B1
(45) Date of Patent: Aug. 16, 2005

(54) METHOD AND SYSTEM FOR TRANSLATION LOOKASIDE BUFFER COHERENCE IN MULTIPROCESSOR SYSTEMS

(75) Inventor: Peter Damron, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 365 days.

(21) Appl. No.: 09/629,085

(22) Filed: Jul. 31, 2000

(51) Int. Cl.[7] .......................................... G06F 12/08
(52) U.S. Cl. .................. 711/207; 711/141; 711/144; 711/133
(58) Field of Search ................... 711/207, 141, 144, 711/133

(56) References Cited

U.S. PATENT DOCUMENTS

| 5,437,017 | A | * | 7/1995 | Moore et al. | 709/213 |
|---|---|---|---|---|---|
| 5,524,216 | A | * | 6/1996 | Chan et al. | 710/107 |
| 5,906,001 | A | * | 5/1999 | Wu et al. | 711/154 |
| 5,946,717 | A | | 8/1999 | Uchibori | 711/207 |
| 6,105,113 | A | * | 8/2000 | Schimmel | 711/146 |
| 6,119,204 | A | * | 9/2000 | Chang et al. | 711/141 |
| 6,263,403 | B1 | * | 7/2001 | Traynor | 711/133 |

FOREIGN PATENT DOCUMENTS

EP   0 592 121 A1   4/1994

OTHER PUBLICATIONS

Black, et al., "Translation Lookaside Buffer Consistency: A Software Approach", Architectural Support for Progr. Lang. & Operat. Systems, Apr. 3, 1989, pp. 113-122.
IBM Technical Disclosure Bulletin, "Simplified Table Lookaside Buffer-Handling Mechanism for a Multi-Processor", vol. 34, No. 12, May 1992, pp. 164-166.
PCT International Search Report for PCT/US 01/23792, date of mailing Jul. 16, 2002.

* cited by examiner

Primary Examiner—Reginald G. Bragdon
(74) Attorney, Agent, or Firm—Gunnison, McKay & Hodgson, L.L.P.

(57) ABSTRACT

This invention is an apparatus, method, and system for translational lookaside buffer coherency in computer systems having a plurality of processors, each having an associated TLB for storing address translation data, and the computer system having a plurality of independent paths upon which the plurality of processors are distributed and a TLB message transmitted on said plurality of independent paths.

6 Claims, 3 Drawing Sheets

METHOD AND SYSTEM FOR TRANSLATION LOOKASIDE BUFFER COHERENCE IN MULTIPROCESSOR SYSTEMS

BACKGROUND OF THE INVENTION

1. Field of the Invention

This invention relates to an apparatus, method and system for translation lookaside buffer ("TLB") coherence in computer systems; more particularly, this invention relates to an apparatus, method and system for TLB coherence in multi-processor computer systems.

2. The Related Art

Virtual memory systems allow the addressing of large amounts of memory as though all of that memory were the main memory of the computer system even though actual main memory may consist of a substantially lessor amount of storage space. Virtual memory systems accomplish this by providing memory management units which translate virtual memory addresses into physical memory addresses. The physical addresses may be stored in the main computer memory, in cache memory systems, or otherwise.

If the physical address is kept in the main computer memory, the main computer memory uses lookup tables to locate the physical address. The computer compares the virtual address to the values stored in the tables to determine the physical address. There are often several levels of tables, and the comparison takes a long time to locate. To overcome this delay, the physical address may be stored in cache memories. Cache memories are fast components to store recently used data and instructions. The caches are first looked at by a processor before going to main memory for any information and are therefore usually connected so that they are rapidly accessible to the processors.

However, the cache memories must be addressed to obtain the information they contain. If addressed using physical addresses, then address translation is required from the virtual address to the physical address. To accomplish this without the use of lookup tables, a typical memory management unit uses a TLB to cache virtual page addresses that have been recently accessed along with their related physical page addresses.

When the TLB is provided with a virtual address that it has, it will provide the corresponding physical address. The physical address, if in the cache memory, allows for immediate access to information that is available to the processor without having to access the page lookup tables in the main memory. If the virtual address is not located in the TLB, otherwise known as a "TLB Miss," the physical address must be retrieved from the lookup tables in the main computer memory system. When the physical address is recovered, it is then stored along with other virtual addresses in the TLB so that it will be immediately accessible the next time. When the information is recovered, it is then stored in the cache under the physical address for immediate access.

Without the TLB, each memory access, either read or write, involved the main computer memory system. Typically the main computer memory system was distantly located, and also was relatively slow in operation. It was found that storing and mapping the addresses in a TLB would be more efficient since it was closer to the processor and faster and reading and writing the data than the main computer memory system. In a multiple processor system that has a TLB associated with each processor, each TLB may contain data associated with a main computer memory system, and each processor may process the data for the addresses and store the results in its respective TLB. Thus, it is possible that many different data values will exist among the multiple TLBs for a single address. This possible inconsistency among corresponding address locations is referred to in the art as the TLB coherency problem.

For a computer system with one processor, the time to provide TLB coherence is not time consuming. The operating system manages TLB coherence to both reference the physical address and/or to remove mappings entered to all the TLBs. However, it is time consuming to provide TLB coherence in multi-processor computer systems. Currently, the operating system sends messages to each individual processor. Each processor is then required to take a trap to the operating system to remove or enter the data into its respective TLB.

There are several disadvantages to the current TLB coherence method. First, it is expensive to provide a trap for each individual processor. Second, the process is very time consuming and slow. Lastly, the process disrupts the executing process of the system and results in future delay. Thus, there exists a need for a more efficient and quicker TLB coherence method for multi-processor systems.

SUMMARY OF THE INVENTION

This invention provides for a more efficient and cost effective way to obtain TLB coherence in computer systems. More specifically, this invention provides a more efficient and cost effective way to obtain TLB coherence in multi-processing computer systems.

A first embodiment of this invention is a method for maintaining TLB coherency in a computer system having a plurality of processors, each having an associated TLB for storing address translation data. The computer system accesses a virtual address in a TLB, locates a corresponding associated physical address, and sends a TLB message from the processor to the main communication network if: (a) the corresponding physical address was not located in the TLB and was required to be inputted into the TLB; (b) the corresponding physical address was removed from the TLB; or (c) the corresponding physical address was moved to another part of the computer network system. The main communication network then sends the TLB message to the plurality of processors.

Another embodiment of this invention is an apparatus for maintaining TLB coherency in a computer system having a plurality of processors, each having an associated TLB for storing address translation data, and the computer system having a plurality of independent paths upon which the plurality of processors are distributed. A TLB message generator having an accessed data address and a TLB message transmitted on said plurality of independent paths.

A further embodiment of this invention is a system for maintaining TLB coherency in a computer system having a plurality of processors, each having an associated TLB for storing address translation data, and the computer system having a plurality of independent paths upon which the plurality of processors are distributed among. The computer system performs an access to a data address from its associated TLB and a TLB message generator transmits a TLB message to a main communication network. The main communication network then sends the TLB message to the plurality of processors.

BRIEF DESCRIPTION OF THE DRAWINGS

The accompanying drawings, which are incorporated in and constitute a part of this Specification, illustrate one or more embodiments of the invention and, together with the present description, serve to explain the principles of the invention.

In the drawings.

DESCRIPTION OF THE PREFERRED EMBODIMENTS

One embodiment of the present invention is described herein in the context of TLB coherence in computer systems. Those of ordinary skill in the art will realize that the following description of the present invention is illustrative only and not in any way limiting. Other embodiments of the invention will readily suggest themselves to such skilled persons having the benefit of this disclosure. Reference will now be made in detail to an implementation of the present invention as illustrated in the accompanying drawings. The same reference numbers will be used throughout the drawings and the following description to refer to the same or like parts.

In the interest of clarity, not all the routine features of the implementations described herein are described. It will of course be appreciated that in the development of any such actual implementation, numerous implementation-specific decisions must be made to achieve a developers' specific goals, such as compliance with system and business related constraints, and that these goals will vary from one implementation to another. Moreover, it will be appreciated that such a development effort might be complex and time-consuming, but would nevertheless be a routine undertaking of engineering for those of ordinary skill in the art having the benefit of this disclosure.

Figure 1:
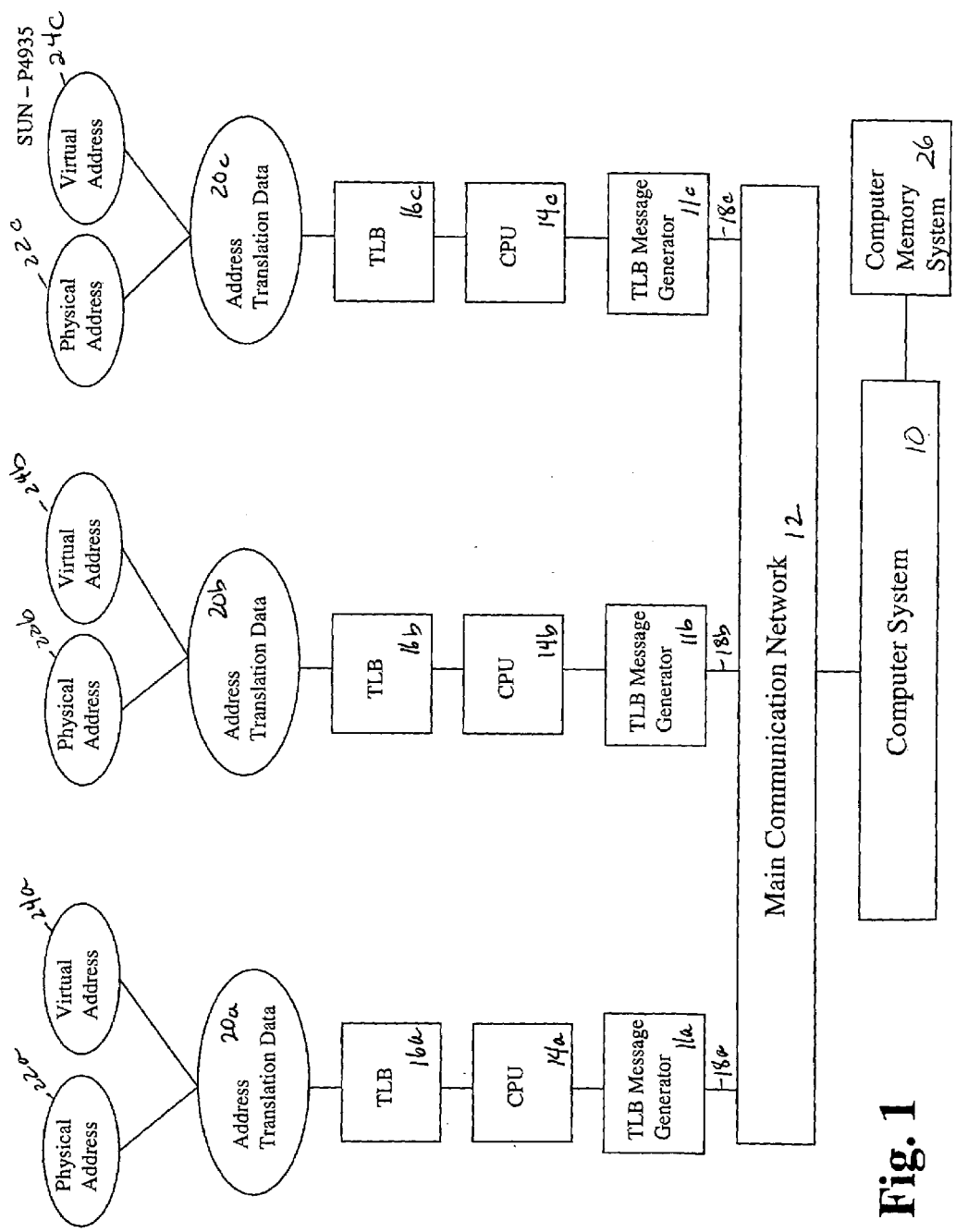
FIG. 1 is a diagram of a computer system having multiple processors.

Referring to FIG. 1, a computer system 10 that has a plurality of processors 14a, 14b, 14c each of which are connected to its own TLB 16a, 16b, 16c. There are independent paths 18a, 18b, 18c to which each processor 14a, 14b, 14c is connected.

Whenever a processor 14a accesses its associated TLB 16a for address translation data 20a to locate a corresponding physical address 22a with a virtual address 24a, the TLB 14a may or may not be able to locate the corresponding physical address. Should a TLB Miss occur, the physical address may be retrieved from the lookup tables in the computer memory system 26 and recorded in the TLB 16a for future reference. Once recorded, the TLB message generator 11a sends out a TLB message with the accessed data address on its independent path 18a to the main communication network 12 to inform other processors 14b, 14c of the new corresponding physical address. The main communication network is, for example, a high speed data bus, or the like. Should the corresponding physical address 22a be located in the TLB 16a, the processor 14a may either modify the corresponding physical address 22a or move the corresponding physical address 22a to another part of the computer system 10. Again, the TLB message generator 11a sends a TLB message with the accessed data address to the main communication network which then transmits the TLB message on the independent paths 18b, 18c to other processors 14b, 14c for comparison of the address translation data 20b, 20c in their associated TLB 16b, 16c. If the corresponding physical address 22a is matched with the virtual address 24a, nothing further occurs.

Each of the other processors 14b, 14c will access its associated TLB 16b, 16c for the address translation data 20b, 20c and compare it with the data address in the TLB message. If the original processor 14a inputted a new physical address into its TLB 16a, then the TLB message will be a read access message to allow the other TLBs 16b, 16c to input the new physical address into its address translation data 20b, 20c. If the original processor modified, invalidated, or removed the physical address to another part of the computer network 10, then the TLB message will be a write access message to allow the other TLBs 16b, 16c to modify, invalidate or remove the physical address.

Figure 2:
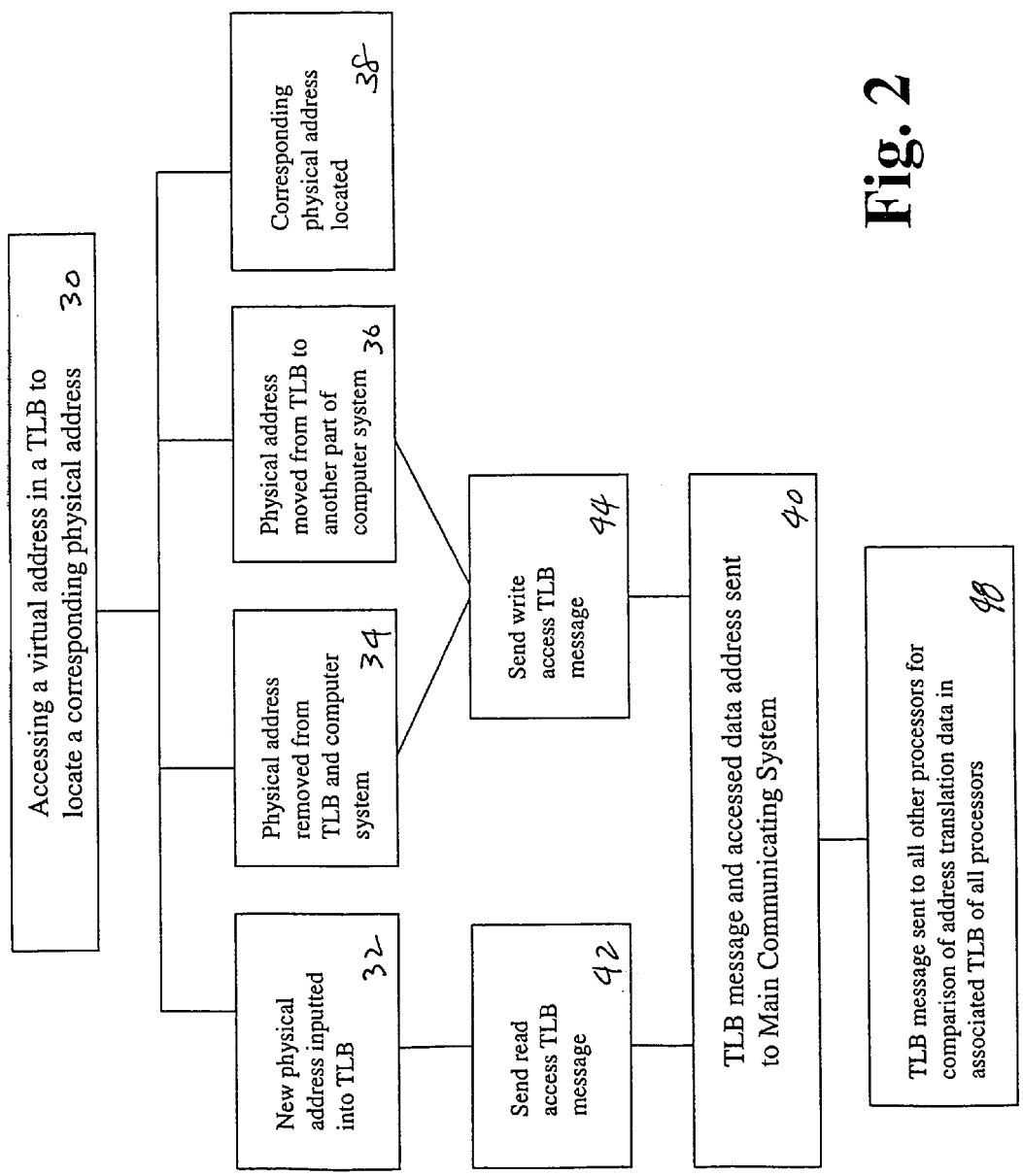
FIG. 2 is a flow chart of one embodiment of the present invention.

Now referring to FIG. 2, a method for maintaining TLB coherency in computer systems in accordance with one embodiment of the present invention is described. In computer systems with multiple processors each having its own associated TLB, each processor may process the data for addresses and store the results in its respective TLB. Thus, it is possible that many different data values will exist among the multiple TLBs for a single address. The present invention therefore provides for a more efficient and less costly method to maintain TLB coherency within a computer system so that each address will have the same data value. A virtual address is accessed in a TLB to locate the corresponding physical address (30). A TLB message generator sends a TLB message to the communication network (40) if: (a) the corresponding physical address was not located in the TLB and was required to be inputted into the TLB (32); (b) the corresponding physical address was removed from the TLB (34); or (c) the corresponding physical address was moved to another part of the computer network system (36). If the physical address 22a matches the physical address 22b, 22c of one of the other processors 14b, 14c, then that address translation data 20b, 20c should be modified, removed, or marked as invalid. If the corresponding physical address is matched with the virtual address (38), nothing further occurs.

If the corresponding physical address was inputted into the TLB, then the TLB message is a read access request to the other processors to input the address translation data into its associated TLB (42). However, if the corresponding physical address was modified, moved or invalidated, then the TLB message is a write access request to modify, remove or invalidate the corresponding physical address (44).

Figure 3:
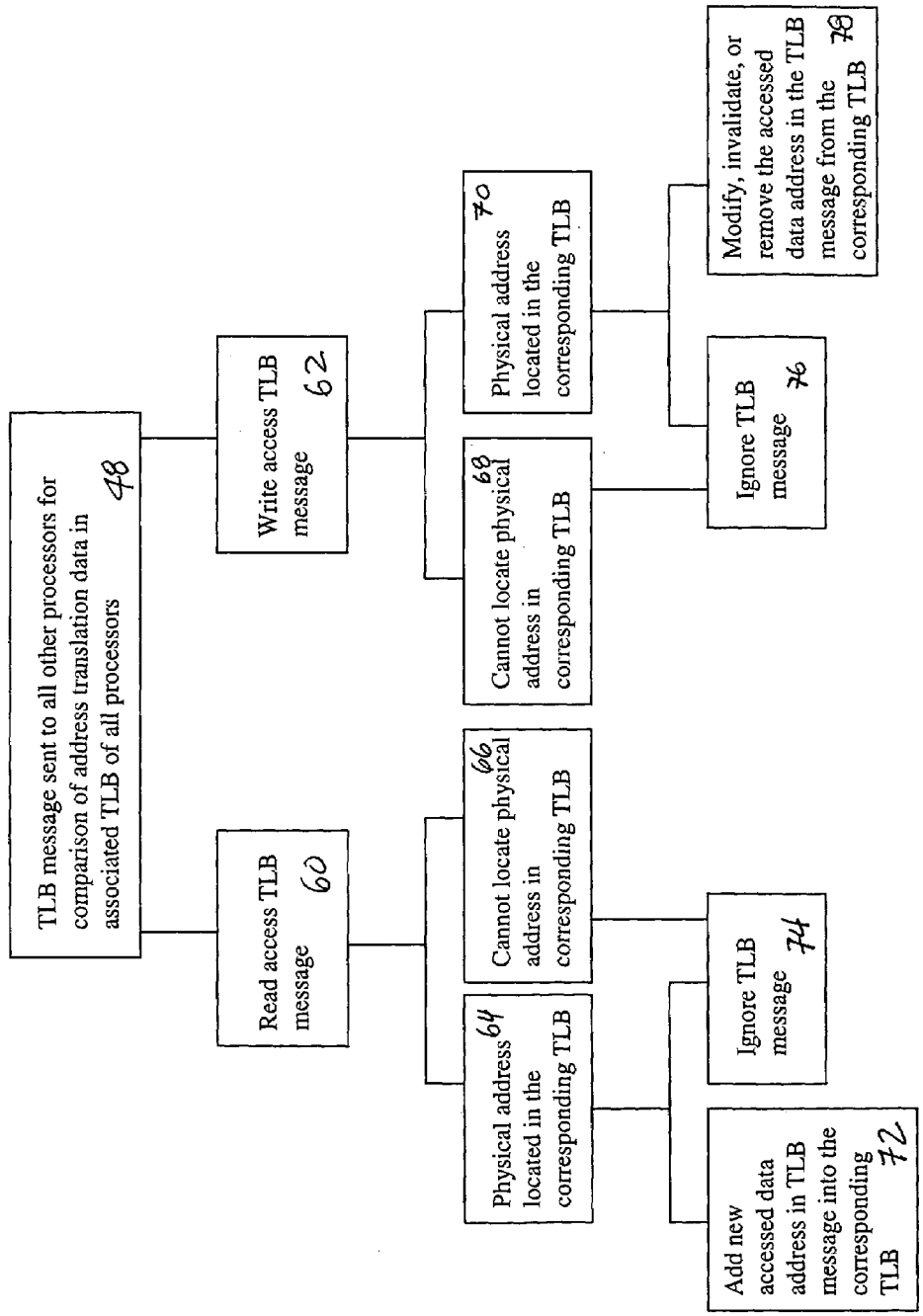
FIG. 3 is a flow chart of one embodiment of the present invention.

The TLB message is sent from the main communication network to each processor in the computer system. Once the TLB message is received, the request is compared to the address translation data on the associated TLB to determine whether the request affects the address translation data stored in the associated TLB (48). Now referring to FIG. 3, should the address translation data be affected, the processor will look to whether the TLB message is a read access TLB message (60) or a write access TLB message (62).

If the TLB message is a read access message (60) and the physical address in the corresponding TLB cannot be located (66), then the TLB message is ignored (74). However, if the physical address is located in the corresponding TLB (64), then the new accessed data address in the TLB message is added to the corresponding TLB (72).

If the TLB message is a write access message (62) and the physical address in the corresponding TLB cannot be located (68), then the TLB message is ignored (76). However, if the physical address is located in the corresponding TLB (70), then the physical address is modified, invalidated or removed from the corresponding TLB (78).

Referring to FIG. 1 and FIG. 2, a system for maintaining TLB coherency in a computer system 10 in accordance with one embodiment of the present invention is described. The computer system 10 may have a plurality of processors 14a, 14b, 14c, each of which has its own associated TLB 16a, 16b, 16c and distributed among a plurality of independent paths 18a, 18b, 18c. A virtual address 24a is accessed in a TLB 16a to locate the corresponding physical address 22a. A TLB generator sends a TLB message to the main communication system (40) if: (a) the corresponding physical address was not located in the TLB and was required to be inputted into the TLB (32); (b) the corresponding physical address was removed from the TLB (43); or (c) the corresponding physical address was moved to another part of the computer network system (36).

Should a TLB Miss occur, the physical address may be retrieved from the lookup tables in the computer memory system 26 and recorded in the TLB 16a for future reference. The main communication network 12 then sends the TLB message with the accessed data address on the independent paths 18b, 18c to inform other processors 14b, 14c of the new corresponding physical address. Should the corresponding physical address be located in the TLB, the processor 14a may either remove the corresponding physical address 22a or move the physical address 22a to another part of the computer system 10. The TLB message generator will send a TLB message with the accessed data address to the main communication network which transmits it on the independent paths 18b, 18c to other processors 14b, 14c for comparison of the address translation data 20b, 20c in their associated TLB 16b, 16c. If the physical address 22a matches the physical address 22b, 22c of one of the other processors 14b, 14c, then that address translation data 20b, 20c should be modified, removed, or marked as invalid. If the corresponding physical address 22a is matched with the virtual address 24a, nothing further occurs.

Each processor 14b, 14c will access its associated TLB 16b, 16c for address translation data and compare it with the data address in the TLB message (48). Now referring to FIG. 3, should the address translation data be affected, the processor will look to whether the TLB message is a read access TLB message (60) or a write access TLB message (62).

If the TLB message is a read access message (60) and the physical address in the corresponding TLB cannot be located (66), then the TLB message is ignored (74). However, if the physical address is located in the corresponding TLB (64), then the new accessed data address in the TLB message is added to the corresponding TLB (72).

If the TLB message is a write access message (62) and the physical address in the corresponding TLB cannot be located 68, then the TLB message is ignored (76). However, if the physical address is located in the corresponding TLB (70), then the physical address is modified, invalidated or removed from the corresponding TLB (78).

While embodiments and applications of this invention has been shown and described, it would be apparent to those skilled in the art that many more modifications than mentioned above are possible without departing from the inventive concepts herein. Thus, what has been disclosed is merely illustrative of the present invention and other arrangements or methods can be implemented by the those skilled in the art without departing from the spirit and scope of the present invention.

I claim:

1. A method for maintaining translation lookaside buffer ("TLB") coherency in a computer system having a plurality of processors, each of the processors having an associated TLB for storing address translation data, the system having a main communication network coupled to the plurality of processors, said method comprising:

accessing a virtual address in a first TLB associated with one of the plurality of processors;

performing an operation on the first TLB based on the accessed virtual address and a physical address corresponding to the accessed virtual address;

generating a TLB message in response to a change in contents of the first TLB caused by the operation performed on the first TLB, the TLB message comprising an access request and at least one of the accessed virtual address and the corresponding physical address;

sending the TLB message to the plurality of processors other than the processor associated with the first TLB via the main communication network; and determining, at each of the plurality of processors other than that associated with the first TLB, if the TLB message affects the address translation data stored in the associated TLB in response to receiving the TLB message wherein the operation causing a change in contents of the first TLB includes:

inputting a first entry into the first TLB when a physical address corresponding to the virtual address is not located in the first TLB;

moving a second entry from the first TLB to another location within the computer system, the second entry associated with a physical address corresponding to the virtual address; and removing a third entry from the first TLB, the third entry associated with a physical address corresponding to the virtual address.

2. A method for maintaining translation lookaside buffer ("TLB") coherency in a computer system having a plurality of processors, each of the processors having an associated TLB for storing address translation data, the system having a main communication network coupled to the plurality of processors, said method comprising:

accessing a virtual address in a first TLB associated with one of the plurality of processors;

performing an operation on the first TLB based on the accessed virtual address and a physical address corresponding to the accessed virtual address;

generating a TLB message in response to a change in contents of the first TLB caused by the operation performed on the first TLB, the TLB message comprising an access request and at least one of the accessed virtual address and the corresponding physical address;

sending the TLB message to the plurality of processors other than the processor associated with the first TLB via the main communication network; and determining, at each of the plurality of processors other than that associated with the first TLB, if the TLB message affects the address translation data stored in the associated TLB in response to receiving the TLB message, wherein the TLB message comprises:

a request for a read access to a first entry to add the address translation data into the associated TLB in each of the plurality of processors, further wherein the TLB message comprises both of the accessed virtual address and the corresponding physical address.

3. A method for maintaining translation lookaside buffer ("TLB") coherency in a computer system having a plurality of processors, each of the processors having an associated TLB for storing address translation data, the system having a main communication network coupled to the plurality of processors, said method comprising:
   accessing a virtual address in a first TLB associated with one of the plurality of processors;
   performing an operation on the first TLB based on the accessed virtual address and a physical address corresponding to the accessed virtual address;
   generating a TLB message in response to a change in contents of the first TLB caused by the operation performed on the first TLB, the TLB message comprising an access request and at least one of the accessed virtual address and the corresponding physical address;
   sending the TLB message to the plurality of processors other than the processor associated with the first TLB via the main communication network; and
   determining, at each of the plurality of processors other than that associated with the first TLB, if the TLB message affects the address translation data stored in the associated TLB in response to receiving the TLB message, wherein the TLB message comprises:
   a request for a write access to a second entry to modify all copies of the second entry in the associated TLB of each of the plurality of processors, further
   wherein the TLB message comprises both of the accessed virtual address and the corresponding physical address.

4. An apparatus for maintaining translation lookaside buffer ("TLB") coherency in a computer system including a plurality of processors, each of the plurality of processors having an associated TLB for storing address translation data, said apparatus comprising:
   means for accessing a virtual address in a first TLB associated with one of the plurality of processors;
   means for performing an operation on the first TLB based on the accessed virtual address and a physical address corresponding to the accessed virtual address;
   means for generating a TLB message in response to a change in contents of the first TLB caused by the operation performed on the first TLB, the TLB message comprising an access request and at least one of the accessed virtual address and the corresponding physical address;
   means for sending the TLB message to the plurality of processors other than the processor associated with the first TLB via the main communication network; and
   means for determining, at each of the plurality of processors other than that associated with the first TLB, if the TLB message affects the address translation data stored in the associated TLB in response to receiving the TLB message
   wherein the operation causing a change in contents of the first TLB includes:
   inputting a first entry into the first TLB when a physical address corresponding to the virtual address is not located in the first TLB;
   moving a second entry from the first TLB to another location within the computer system, the second entry associated with a physical address corresponding to the virtual address; and
   removing a third entry from the first TLB, the third entry associated with a physical address corresponding to the virtual address.

5. An apparatus for maintaining translation lookaside buffer ("TLB") coherency in a computer system including a plurality of processors, each of the plurality of processors having an associated TLB for storing address translation data, said apparatus comprising:
   means for accessing a virtual address in a first TLB associated with one of the plurality of processors;
   means for performing an operation on the first TLB based on the accessed virtual address and a physical address corresponding to the accessed virtual address;
   means for generating a TLB message in response to a change in contents of the first TLB caused by the operation performed on the first TLB, the TLB message comprising an access request and at least one of the accessed virtual address and the corresponding physical address;
   means for sending the TLB message to the plurality of processors other than the processor associated with the first TLB via the main communication network; and
   means for determining, at each of the plurality of processors other than that associated with the first TLB, if the TLB message affects the address translation data stored in the associated TLB in response to receiving the TLB message, wherein
   said means for transmitting comprises:
   means for interconnecting each of the plurality of a processors to one another via corresponding one of the plurality of independent paths, further
   wherein the TLB message comprises both of the accessed virtual address and the corresponding physical address.

6. An apparatus for maintaining translation lookaside buffer ("TLB") coherency in a computer system including a plurality of processors, each of the plurality of processors having an associated TLB for storing address translation data, said apparatus comprising:
   means for accessing a virtual address in a first TLB associated with one of the plurality of processors;
   means for performing an operation on the first TLB based on the accessed virtual address and a physical address corresponding to the accessed virtual address;
   means for generating a TLB message in response to a change in contents of the first TLB caused by the operation performed on the first TLB, the TLB message comprising an access request and at least one of the accessed virtual address and the corresponding physical address;
   means for sending the TLB message to the plurality of processors other than the processor associated with the first TLB via the main communication network; and
   means for determining, at each of the plurality of processors other than that associated with the first TLB, if the TLB message affects the address translation data stored in the associated TLB in response to receiving the TLB message, wherein the TLB message comprises:
   a request for a read access to a first entry to add the address translation data into the associated TLB in each of the plurality of processors, further
   wherein the TLB message comprises both of the accessed virtual address and the corresponding physical address.

* * * * *